(12) United States Patent
Que et al.

(10) Patent No.: US 7,397,551 B2
(45) Date of Patent: Jul. 8, 2008

(54) METHOD FOR VERIFYING SCAN PRECISION OF A LASER MEASUREMENT MACHINE

(75) Inventors: Ling-Hua Que, Guangdong (CN); Zhong-Kui Yuan, Guangdong (CN); Wei Xu, Guangdong (CN); Xiao-Bo Xin, Guangdong (CN); Kuei-Yang Lin, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 334 days.

(21) Appl. No.: 11/308,428

(22) Filed: Mar. 24, 2006

(65) Prior Publication Data

US 2006/0215150 A1 Sep. 28, 2006

(30) Foreign Application Priority Data

Mar. 25, 2005 (CN) .................... 2005 1 0033855

(51) Int. Cl.
*G01N 21/00* (2006.01)

(52) U.S. Cl. .................... 356/237.1; 356/608; 359/226; 359/900

(58) Field of Classification Search ... 356/237.1–237.5, 356/601–623, 394; 359/226, 900
See application file for complete search history.

(56) References Cited

U.S. PATENT DOCUMENTS

| 5,465,152 | A | * | 11/1995 | Bilodeau et al. | 356/602 |
| 6,879,403 | B2 | * | 4/2005 | Freifeld | 356/601 |
| 7,256,896 | B2 | * | 8/2007 | Que et al. | 356/600 |
| 2001/0024309 | A1 | | 9/2001 | Shim | |
| 2002/0140949 | A1 | * | 10/2002 | Sasaki et al. | 356/606 |
| 2006/0221349 | A1 | * | 10/2006 | Que et al. | 356/601 |

* cited by examiner

*Primary Examiner*—Hoa Q Pham
(74) *Attorney, Agent, or Firm*—Winston Hsu

(57) ABSTRACT

A method for verifying scan precision of a laser measurement machine includes the steps of: preparing a standardized BGA model; measuring Z coordinates values of each solder ball peak of the BGA model for certain times; determining a Z coordinates conventional true value of each solder ball peak; measuring X, Y coordinates values of each solder ball centre of the BGA model; determining a coplanarity conventional true value of a seating-plane; determining an optimum scanning mode; determining optimum scanning parameters under the optimum scanning mode; scanning the BGA model under the optimum scanning parameters and the optimum scanning mode; obtaining X, Y, Z coordinates values of each solder ball peak; evaluating the veracity of Z coordinates of each solder ball peak; evaluating the veracity and repetitiveness of coplanarity; and evaluating scan precision of the laser measurement machine.

9 Claims, 2 Drawing Sheets

METHOD FOR VERIFYING SCAN PRECISION OF A LASER MEASUREMENT MACHINE

FIELD OF THE INVENTION

The present invention generally relates to methods for verifying measurement precision, and more particularly to a method for verifying scan precision of a laser measurement machine.

DESCRIPTION OF RELATED ART

Product quality has long been one of the most important factors in maintaining a typical manufacturing enterprise's competitiveness. How to improve the quality of products is an important ongoing pursuit of such an enterprise. Therefore, it is essential to verify whether specifications of products meet with user requirements before a batch production. For a BGA (Ball Grid Array), a three-dimensional curve surface or a transparent part, conventional measure methods are using CCD (Charge Coupled Device) to measure or using a vision probe to process contact measurement.

Today, laser can be found in a broad range of applications within the industry, where it can be used for such things as pointing and measuring. In the manufacturing industry, laser is used to measure the ball cylindricity in bearings by observing the dispersion of a laser beam when reflected on the ball. Another example is to measure the shadow of a steel band by using a laser beam to find out the thickness of the band. More and more industrial processes require or prefer non-contact measurement. Laser measurement provides a new approach to control the production and quality of products. Sensitive materials that are previously considered difficult or even impossible to measure because they are hot, soft, sticky, elastic, sterile or moving fast, can now be measured precisely by using laser measurement. Laser measurement has no influence on the material, and the material has little influence on the measurement. In a sense, laser measurement is more than only an alternative. The rapid response of these non-contact measuring systems ensures their easy integration into production processes and industrial control systems. 100% online quality control can be guaranteed. With the applications of laser measurement technology in measurement field, a great variety of laser measurement machines are manufactured. Before using a certain laser measurement machine to measure objects, users need to verify scan precision of the laser measurement machine, in order to ensure measurement veracity. If the precision doesn't meet with user requirements, the users need to debug the laser measurement machine, and correct it to be acceptable. However, generally, manufacturers only provide users with reference scan precision of laser measurement machines, but don't provide methods for verifying scan precision of the laser measurement machines.

What is needed, therefore, is a method for verifying scan precision of a laser measurement machine, which can confirm the scan precision of the laser measurement machine, in order to provide user dependable measuring results.

SUMMARY OF INVENTION

One embodiment provides a method for verifying scan precision of a laser measurement machine. The laser measurement machine is connected with a computer and used for verifying scan precision of the laser measurement machine when measuring a BGA. The method includes the steps of: (a) preparing a standardized BGA model; (b) measuring Z coordinates values of each solder ball peak on the BGA model for certain times; (c) determining a Z coordinates conventional true value of each solder ball peak; (d) measuring X, Y coordinates values of each solder ball centre on the BGA model; (e) determining a coplanarity conventional true value of a seating-plane; (f) determining an optimum scanning mode; (g) determining optimum scanning parameters under the optimum scanning mode; (h) scanning the BGA model under the optimum scanning parameters and the optimum scanning mode; (i) obtaining X, Y, Z coordinates values of each solder ball peak; (j) evaluating the veracity of Z coordinates of each solder ball peak; (k) evaluating the veracity and repetitiveness of coplanarity; and (l) evaluating scan precision of the laser measurement machine.

Other objects, advantages and novel features of the embodiments will be drawn from the following detailed description together with the attached drawings, in which:

DETAILED DESCRIPTION

Figure 1:
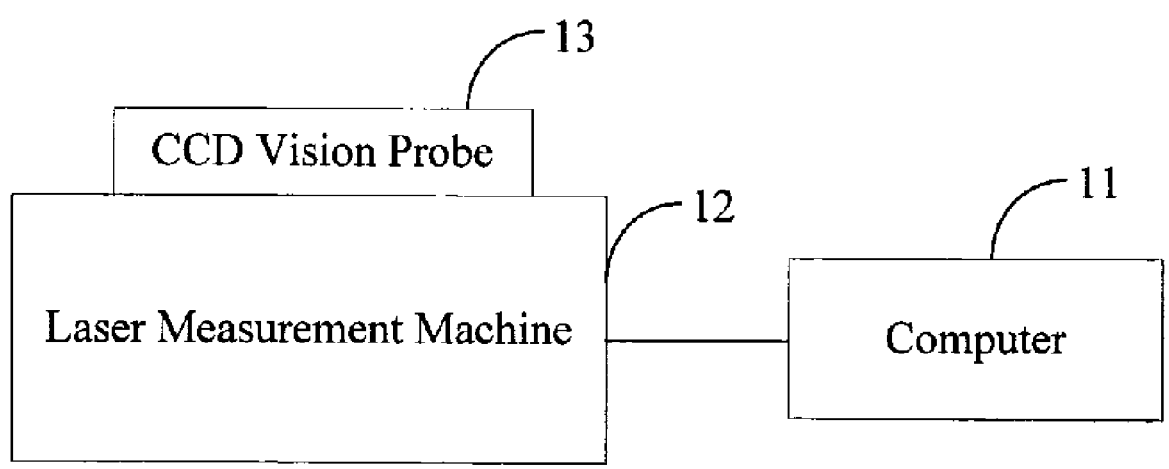
FIG. 1 is a schematic diagram of hardware configuration of a system for verifying scan precision of a laser measurement machine when measuring a BGA (Ball Grid Array) in accordance with a preferred embodiment.

FIG. 1 is a schematic diagram of hardware configuration of a system for verifying scan precision of a laser measurement machine when measuring a BGA (Ball Grid Array) (hereinafter, "the system"), in accordance with a preferred embodiment. The system typically includes a computer 11, and a laser measurement machine 12 for a BGA to be laid thereon for measurement. The computer 11 is connected with the laser measurement machine 12 via a data bus. A Charged Coupled Device (hereinafter, "CCD") vision probe 13 is installed on the laser measurement machine 12. The CCD vision probe 13 is used for measuring X coordinates values and Y coordinates values of each solder ball centre of the BGA in a coordinates system. The computer 11 is installed with particular software for controlling the laser measurement machine 12 to measure the BGA. In addition, the computer 11 also stores particular measuring data and calculating data used for verifying scan precision of the laser measurement machine 12.

Figure 2:
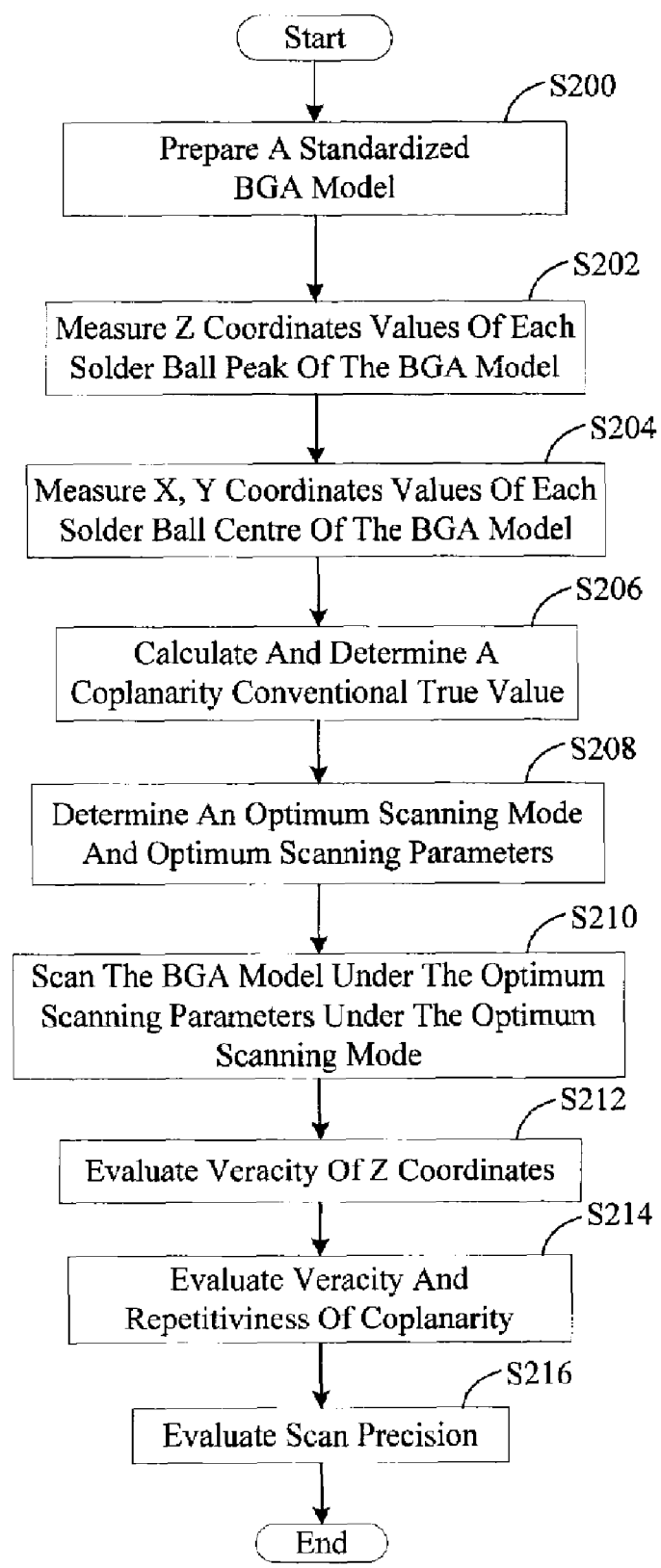
FIG. 2 is a flow chart of a method for verifying scan precision of a laser measurement machine when measuring a BGA in accordance with a preferred embodiment.

FIG. 2 is a flow chart of a preferred method for verifying scan precision of the laser measurement machine 12 when measuring a BGA. In step S200, a standardized BGA model is prepared according to particular requirements. The requirements may include that: the shape and dimensions of the BGA model should be consistent with the shape and dimensions of a practical BGA product; the flatness of each plane of the BGA model should not be more than 2 μm; the parallelism for each pair of parallel planes and the verticality for each pair of orthogonal planes should not be more than 3 μm; there should be three higher solder balls surrounding the centroid of the BGA model to form a seating plane. In step S202, the height of each solder ball peak is measured for certain times by using a micrometer calipers, in order to obtain a plurality of Z coordinates values of each solder ball peak in a coordinates system. Then, an average Z coordinates value of each solder ball peak can be calculated according to the plurality of Z coordinates values. The average Z coordinates value is regarded as a conventional true value of Z coordinates of a corresponding solder ball peak. In step S204, the CCD vision probe 13 on the laser measurement machine 12 measures X coordinates values and Y coordinates values of each solder ball centre in the coordinates system for certain times, and stores all the coordinates values in the computer 11. Subsequently, the computer 11 calculates an average X coordinates value and an average Y coordinates value of each solder ball center. In step S206, the computer 11 chooses three solder balls, each with a relatively higher Z coordinates value. The three solder balls surround the centroid of the BGA model, and peaks of the three solder balls constitute a seating-plane. The computer 11 calculates a distance between the peak of each other solder ball on the BGA model and the seating-plane. The largest distance is regarded as a coplanarity conventional true value of the seating-plane. In step S208, the laser measurement machine 12 tentatively scans the BGA model under different scanning modes. The scanning modes may include Spiral, Circle, Zigzag and Area. The main objective of changing the scanning mode is to obtain an optimum scanning mode, in order to scan the BGA model more accurately. After comparing scanning results under the scanning modes, an optimum scanning mode is determined. In this preferred embodiment, the Spiral scanning mode is the optimum scanning mode, since a probability of scanning the peak of each solder ball on the BGA model is bigger than that under any other mode and the number of peaks scanned per second is more than that under any other mode. In order to determine optimum scanning parameters, the laser measurement machine 12 further tentatively scans the BGA model under the Spiral scanning mode by means of changing a parameter and fixing the other parameters. The scanning parameters include sample rate, seek speed, scanning speed and filter factor. An example of the process of determining an optimum scanning speed is provided below. In the preferred embodiment, the scanning speed is set at 10 mm/sec and 3 mm/sec respectively. Under the condition of changing the other parameters, the laser measurement machine 12 first scans the BGA model at the scanning speed of 10 mm/sec for certain times. The computer 11 obtains a set of X, Y, Z coordinates values of each solder ball peak, and calculates a bias between each Z coordinates value and the Z coordinates conventional true value of each corresponding solder ball peak. In the preferred embodiment, the largest one of the biases equals 0.1042 μm. Similarly, a second largest bias is calculated to be 0.0010 μm at the scanning speed of 3 mm/sec, which is much smaller than the largest bias generated at the scanning speed of 10 mm/sec. It is confirmed that the optimum scanning speed should be smaller, for example, it can be 3 mm/s. In addition, it is determined that the other parameters almost have no impact on the measuring results after repeatedly experimenting in the same way. In the preferred embodiment, in order to verify the scan precision of the laser measurement machine 12 under the optimum scanning mode and scanning speed, in step S210, the laser measurement machine 12 scans the BGA model at the scanning speed of 3 mm/s and under the Spiral scanning mode for five times. The computer 11 obtains five sets of X, Y, Z coordinates values of each solder ball peak. And then, the computer 11 calculates five coplanarity values by using the five sets of X, Y, Z coordinates values. In step S212, the computer 11 compares a bias between each Z coordinates value and a corresponding Z coordinates conventional true value. For all the biases, the largest one is used to evaluate the veracity of Z coordinates of the corresponding solder ball peak, which equals about 0.01 mm in the preferred embodiment. In step S214, the computer 11 calculates a standard deviation according to the coplanarity values calculated in step S210 described above, and calculates biases between the five coplanarity values and the coplanarity conventional true value. The standard deviation is used for evaluating the repetitiveness of the coplanarity, and the largest bias is used for evaluating the veracity of the coplanarity. In the preferred embodiment, the veracity and repetitiveness of the coplanarity is less than 2 μm. In step S216, the scan precision of the laser measurement machine 12 is determined according to the veracity and repetitiveness of the coplanarity and the veracity of Z coordinates of each solder ball peak.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for verifying scan precision of a laser measurement machine, the method comprising the steps of:
   preparing a standardized BGA model;
   measuring Z coordinates values of each solder ball peak of the BGA model for certain times;
   determining a Z coordinates conventional true value of each solder ball peak;
   measuring X, Y coordinates values of each solder ball centre of the BGA model; determining a coplanarity conventional true value of a seating-plane;
   determining an optimum scanning mode;
   determining optimum scanning parameters under the optimum scanning mode;
   scanning the BGA model under the optimum scanning parameters and the optimum scanning mode;
   obtaining X, Y, Z coordinates values of each solder ball peak;
   evaluating the veracity of Z coordinates of each solder ball peak;
   evaluating the veracity and repetitiveness of coplanarity; and
   evaluating scan precision of the laser measurement machine.

2. The method according to claim 1, wherein the BGA model is prepared according to particular requirements, which include that: there should be three higher solder ball surrounding the centroid of the BGA model to form a seating plane.

3. The method according to claim 1, wherein the step of determining a Z coordinates conventional true value of each solder ball peak comprises the steps of:
   calculating an average Z coordinates value of each solder ball peak;
   regarding the average Z coordinates value as the Z coordinates conventional true value of the solder ball peak.

4. The method according to claim 1, wherein the step of determining a coplanarity conventional true value of a seating-plane comprises the steps of:
   choosing three solder balls, each with a relatively higher Z coordinates value, the three solder balls surrounding the centroid of the BGA model to form the seating-plane;
   calculating a distance between the peak of each other solder ball and the seating-plane; and
   regarding the largest distance as the coplanarity conventional true value of the seating-plane.

5. The method according to claim 1, wherein the step of determining an optimum scanning mode comprises the steps of:
   tentatively scanning the BGA model under different scanning modes; and
   determining the optimum scanning model according to a probability of scanning the peak of each solder ball on the BGA model and the number of peaks scanned per second.

6. The method according to claim 5, wherein the scanning modes include Spiral, Circle, Zigzag and Area.

7. The method according to claim 1, wherein the step of determining optimum scanning parameters comprises the steps of:
   scanning the BGA model under different scanning parameters and the optimum scanning mode, and obtaining a plurality of Z coordinates values of each solder ball; and
   determining the optimum scanning parameters according to a largest bias between the Z coordinates value of each solder ball and the Z coordinates conventional true value.

8. The method according to claim 1, wherein the step of evaluating the veracity of Z coordinates of each solder ball peak comprises the steps of:
   comparing a bias between each Z coordinates value and a corresponding Z coordinates conventional true value;
   evaluating the veracity of Z coordinates of the corresponding solder ball peak according to a largest bias.

9. The method according to claim 1, wherein the step of evaluating the veracity and repetitiveness of coplanarity comprises the steps of:
   calculating a plurality of coplanarity values according to the X, Y, Z coordinates values of each solder ball peak;
   calculating a standard deviation according to the coplanarity values;
   evaluating the repetitiveness of the coplanarity according to the standard deviation;
   calculating a bias between each coplanarity value and the coplanarity conventional true value; and
   evaluating the veracity of the coplanarity according to a largest bias.

* * * * *